(12) United States Patent
Huwer et al.

(10) Patent No.: US 12,508,905 B2
(45) Date of Patent: Dec. 30, 2025

(54) LIGHT GUIDE FOR ROTARY KNOB OPERATION DEVICE

(71) Applicant: VOLKSWAGEN AKTIENGESELLSCHAFT, Wolfsburg (DE)

(72) Inventors: Wojciech Huwer, Braunschweig (DE); Henning Thiele, Wolfsburg (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 0 days.

(21) Appl. No.: 18/757,614

(22) Filed: Jun. 28, 2024

(65) Prior Publication Data
US 2025/0010714 A1    Jan. 9, 2025

(30) Foreign Application Priority Data
Jul. 5, 2023 (DE) .................. 10 2023 206 386.7

(51) Int. Cl.
*B60K 35/10* (2024.01)
*B60K 35/50* (2024.01)

(52) U.S. Cl.
CPC ............. *B60K 35/10* (2024.01); *B60K 35/50* (2024.01); *B60K 2360/126* (2024.01); *B60K 2360/336* (2024.01)

(58) Field of Classification Search
CPC ...... H01H 19/025; H01H 9/161; H01H 9/182; B60Q 3/62; B60Q 3/64; B60K 2360/126; B60K 2360/336; B60K 2360/345; G05G 1/105
See application file for complete search history.

(56) References Cited

U.S. PATENT DOCUMENTS

| | | | | |
|---|---|---|---|---|
| 2,713,103 A * | 7/1955 | Slate | ................... | H01H 19/025 200/316 |
| 2,750,918 A * | 6/1956 | Willman | ............... | H01H 19/025 116/DIG. 5 |
| 4,549,050 A * | 10/1985 | Lang | ................... | H01H 13/023 200/312 |
| 4,583,151 A * | 4/1986 | Nagel | ................... | G05G 1/105 362/333 |
| 5,030,811 A * | 7/1991 | von Gaisberg | .......... | B60Q 3/64 219/268 |
| 6,565,223 B2 * | 5/2003 | Liao | ..................... | H01H 19/025 362/100 |
| 6,685,327 B2 * | 2/2004 | Dorrie | ................. | H01H 19/025 362/23.04 |

(Continued)

FOREIGN PATENT DOCUMENTS

| CN | 102971693 A | 3/2013 |
|---|---|---|
| CN | 112013104 A | 12/2020 |

(Continued)

*Primary Examiner* — Ismael Negron
(74) *Attorney, Agent, or Firm* — BARNES & THORNBURG LLP

(57) ABSTRACT

A light guide includes a viewing side, a rear side opposite the viewing side, a plurality of rib elements formed on the rear side and configured to define a light scatter output from the light guide. The light guide is configured to be coupled to a rotary knob operating device, with the rib elements providing a compression fit with the rotary knob operating device.

8 Claims, 2 Drawing Sheets

(56) References Cited

U.S. PATENT DOCUMENTS

| | | | |
|---|---|---|---|
| 7,211,755 B1* | 5/2007 | Wang | H01H 19/005 |
| | | | 200/11 R |
| 8,353,611 B2* | 1/2013 | Truesdale | H01H 13/023 |
| | | | 362/650 |
| 8,772,721 B2 | 7/2014 | Hasselbrinck et al. | |
| 8,783,927 B2* | 7/2014 | Claprood | G05G 1/105 |
| | | | 362/555 |
| 8,801,206 B2* | 8/2014 | Chen | G05G 1/105 |
| | | | 362/85 |
| 9,045,078 B2 | 6/2015 | Tovar et al. | |
| 9,443,676 B2* | 9/2016 | Na | H01H 19/025 |
| 9,607,792 B2* | 3/2017 | Ebrom | H01H 19/025 |
| 9,734,967 B2* | 8/2017 | Fukui | H01H 19/025 |
| 10,576,882 B2* | 3/2020 | Birman | B60Q 3/64 |
| 10,598,429 B2* | 3/2020 | Kaymak | H01H 19/025 |
| 10,696,161 B2* | 6/2020 | Hélot | H01H 19/025 |
| 10,790,101 B2* | 9/2020 | Yu | H01H 9/18 |
| 10,890,331 B2* | 1/2021 | Kim | H01H 19/025 |
| 10,910,176 B2* | 2/2021 | Altonen | H01H 19/025 |
| 11,331,885 B2* | 5/2022 | Hennion | B32B 17/10036 |
| 11,378,995 B2 | 7/2022 | Park et al. | |
| 11,881,366 B2* | 1/2024 | Carlson | H01H 3/022 |
| 11,999,288 B2 | 6/2024 | Rehfuss et al. | |
| 12,027,327 B2* | 7/2024 | Hong | H01H 19/14 |
| 2009/0116239 A1* | 5/2009 | Wu | H01H 13/023 |
| | | | 362/253 |
| 2013/0163226 A1 | 6/2013 | Chen et al. | |
| 2021/0054924 A1 | 2/2021 | Kim et al. | |

FOREIGN PATENT DOCUMENTS

| | | |
|---|---|---|
| CN | 114060502 A | 2/2022 |
| DE | 102011112134 A1 | 3/2013 |
| DE | 102014222200 B3 | 1/2016 |
| DE | 102016216276 A1 | 3/2018 |
| DE | 102020113260 A1 | 5/2021 |
| DE | 102022119181 B3 | 9/2023 |
| FR | 2835961 A1 | 8/2003 |

* cited by examiner

LIGHT GUIDE FOR ROTARY KNOB OPERATION DEVICE

PRIORITY CLAIM

This patent application claims priority to German Patent Application No. 10 2023 206 386.7, filed 5 Jul. 2023, the disclosure of which is incorporated herein by reference in its entirety.

SUMMARY

Illustrative embodiments relate to an interior device for a passenger compartment of a transportation vehicle and to a transportation vehicle.

BRIEF DESCRIPTION OF THE DRAWINGS

Disclosed embodiments will be described with reference to the figures. The features and feature combinations in the description, as well as the features and feature combinations presented in the figures, may be used not only in the combination respectively indicated but also in other combinations or individually, without departing from the scope of the disclosure. In the drawings.

DETAILED DESCRIPTION

Figure 1:
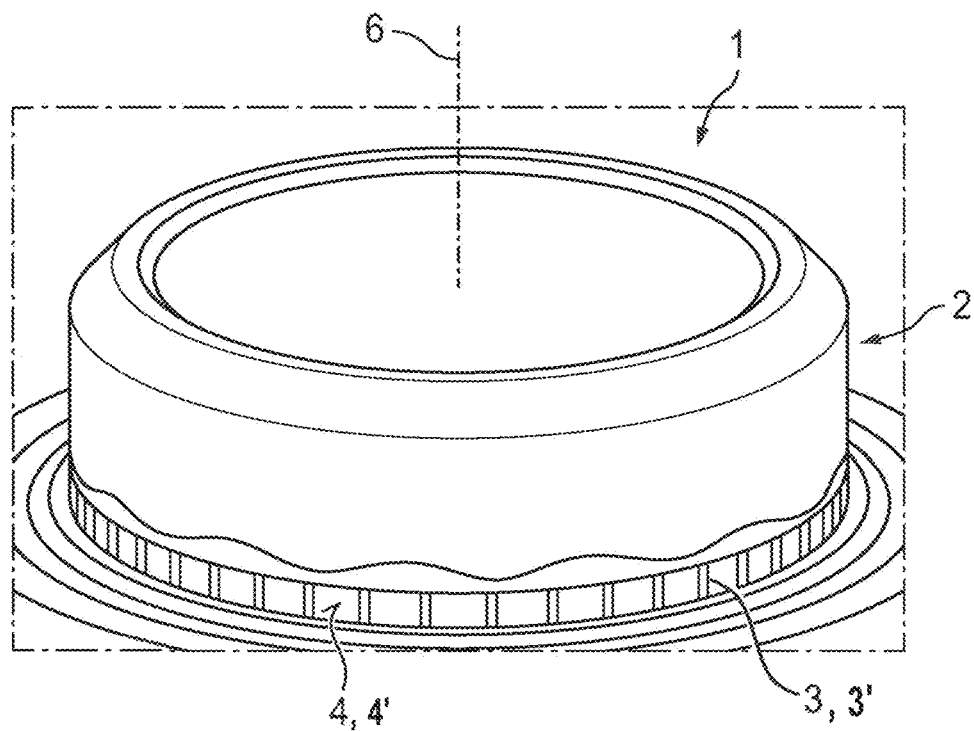
FIG. 1 shows a schematic perspective view of a rotary knob operating device.

An ambient light apparatus for a selector wheel switching apparatus is known from DE 10 2020 113 260 A1. This ambient light apparatus comprises a printed circuit board which is coupled to a main housing. The ambient light apparatus furthermore comprises a light source, which is fixed on the printed circuit board, and a light guide which is coupled to the main housing and is configured in such a way that it outputs light of the light source. The ambient light apparatus furthermore comprises a light-emitting mechanism, which is provided in a switching selector wheel that is rotatably coupled in relation to the main housing, and which is configured in such a way that it reflects the light of the light source, which is output via the light guide, to emit this light outside the switching selector wheel as ambient light.

Furthermore, CN 114060502 A discloses an electronic gearshift apparatus having a knob module.

Furthermore, FR 2 835 961 B1 discloses an operating element for a transportation vehicle, which has a rotatable handle with a display window that can be illuminated via an optical waveguide connected to light sources. The display window is illuminated with light of a first color in a first angular section of the handle and with light of a second color in a second angular section.

Disclosed embodiments provide a solution that allows straightforward arrangement of a light guide in a passenger compartment of a transportation vehicle.

The disclosed embodiments relate to an interior device for a passenger compartment of a transportation vehicle, in particular, a passenger car. The interior device is configured to be arranged in a passenger compartment of the transportation vehicle. The interior device is visible at least in the regions in the passenger compartment of the transportation vehicle. The interior device comprises a light guide configured to guide light. A light guide refers to component parts such as fibers, tubes or rods, which transport light over short or long paths. The light guide has a viewing side and a rear side opposite to the viewing side. In the intended installation position of the interior device in the passenger compartment, light is coupled out from the light guide through the viewing side. Furthermore, in the intended installation position, the viewing side of the light guide is visible in the passenger compartment. It is therefore not intended that the light emitted by the light guide can reach the eyes of vehicle passengers of the transportation vehicle only via reflection on a surface in the transportation vehicle. Instead, it is intended that the light coupled out from the light guide through the viewing side can strike the eyes of vehicle passengers sitting on respective vehicle seats directly and therefore without further reflection actions. It is intended that the light guide has at least one fastening element on the rear side, the structure of which predefines a light pattern coupled out on the viewing side.

The interior device furthermore comprises a transportation vehicle component on which the light guide is held by the fastening element. This means that the transportation vehicle component is used for mounting the light guide. Depending on the configuration of the at least one fastening element, the fastening element is provided by a material aggregation of the light guide, which leads to a greater thickness of the light guide in the region of the at least one fastening element, or is provided by at least one recess so that the light guide has a smaller thickness in the region of the fastening element than in adjacent regions. Respective influences on the light pattern coupled out on the viewing side behave according to whether the fastening element is provided by an elevation or a recess on the rear side of the light guide. In particular, the light pattern coupled out from the light guide on the front side may be purposely adjusted by selecting a shape of the fastening element, a number of fastening elements to be provided and a position of the respective fastening elements on the rear side. The at least one fastening element is therefore used on the one hand to fasten the light guide on the transportation vehicle component and on the other hand to influence the design of the light pattern emitted by the light guide. Because the at least one fastening element is arranged on the rear side of the light guide, the light guide can be fastened straightforwardly on the transportation vehicle component and the interior device can thereby be produced straightforwardly. Furthermore, the described interior device makes it possible that a light design can be provided in the vehicle passenger compartment with few components since the light guide is designed to provide the light pattern coupled out to be seen directly by vehicle passengers and further faces for reflecting the light to implement indirect illumination are not needed.

According to at least one exemplary embodiment, a plurality of identical fastening elements arranged at regular distances from one another are provided on the rear side of the light guide, so that in the intended installation position the light pattern coupled out on the viewing side has a regular structure. By using the plurality of fastening elements, on the one hand, particularly secure holding of the light guide on the transportation vehicle component can be ensured and, on the other hand, a particularly uniform appearance of the light pattern coupled out on the viewing side can be achieved. By using the appearance of the light pattern caused because of the plurality of fastening elements arranged at regular distances, the vehicle component on which the light guide is held may be masked at least in regions. The transportation vehicle component may, therefore, be difficult to see or even invisible through the light guide when looking at the viewing side of the light guide.

According to a further disclosed embodiment, the light guide is configured integrally. The light guide is therefore produced from one piece and therefore consists of only one part. This makes it possible that the light guide can be produced straightforwardly and rapidly since tolerances of a plurality of component parts with respect to one another do not occur, or do not need to be compensated for. For example, the light guide may be injection-molded integrally. The fastening elements of the light guide are therefore formed from the same material as the rest of the light guide. Furthermore, uniform light guiding in the light guide can be achieved because of the integral nature since there are no interfaces inside the light guide.

According to a further disclosed embodiment, the interior device is configured as a rotary knob operating device. For example, a vehicle function of the transportation vehicle may be controlled by using this rotary knob operating device. User inputs of vehicle passengers of the transportation vehicle, in particular, of the driver of the transportation vehicle, may be performed by using the rotary knob operating device. The light guide is intended to be configured as a rotary element which can be rotated about a rotation axis to perform a user input of a vehicle passenger. It is furthermore intended that the transportation vehicle component is a rolling bearing that can be rotated about a rotation axis. Furthermore, it is intended that the at least one fastening element is a compression rib via which the rotary element fitted onto the rolling bearing forms a frictional engagement with the rolling bearing so that the rotary element is connected fixed in rotation to the rolling bearing. Compression ribs are configured to deform so that they can be applied onto the rolling bearing reliably and over a contact area that is as large as possible. In addition, the compression ribs generate friction between the light guide and the transportation vehicle component, in particular, the rolling bearing, so that the rotary knob is secured on its location relative to the rolling bearing. Compression ribs constitute a rapid and economical method for fastening the rotary knob on the rolling bearing. For example, semicircular ribs with a radius of about 0.8 millimeters may be used as compression ribs. The compression ribs therefore allow straightforward and secure centering of the rotary knob on the rolling bearing and secure holding of the rotary knob on the rolling bearing. Furthermore, respective compression ribs allow at least substantially striated structuring of the light pattern coupled out from the light guide on the viewing side.

In this context, the rotary element may have a plurality of compression ribs arranged distributed at regular distances over the circumference of the rotation axis. This plurality of compression ribs allows large frictional contact between the rotary element and the rolling bearing, so that the rotary element is held securely on the rolling bearing. Furthermore, the uniformly distributed arrangement of the compression ribs over the circumference of the rotary element allows secure centering of the rotary element with respect to the rotation axis. An undesired off-center arrangement of the rotary element with respect to the rotation axis of the rolling bearing can therefore be prevented. In particular, the rotary element may have about 32 compression ribs which are arranged distributed at uniform distances over the circumference of the rotary element.

According to a further disclosed embodiment, the at least one compression rib runs with its longitudinal extent direction in the axial direction of the rotation axis. This means that the compression rib runs with its longitudinal extent direction parallel to the rotation axis. This leads to a stripe structure of the light pattern coupled out on the viewing side with stripes running parallel to the rotation axis. By this configuration, the vehicle passengers can intuitively identify straightforwardly where the rotation axis about which the rotary element is to be rotated for controlling the transportation vehicle function runs. Consequently, the driver can concentrate well on controlling the transportation vehicle when operating the rotary knob operating device, so that high traffic safety is achieved.

According to a further disclosed embodiment, a cross section of the at least one compression rib is selected as a function of a light pattern to be generated on the viewing side in the intended installation position. A hard transition in respect of the junction of the at least partially cylindrical cross section of the compression rib with the rest of the wall thickness of the light guide leads to clearly delimited lines in the structure of the light pattern coupled out on the viewing side. These lines of the structure of the light pattern may be softened, and therefore merged with the rest of the light pattern, by selecting a soft transition from the at least partially cylindrical cross section of the respective compression rib onto the rest of the wall thickness of the light guide. Furthermore, a width of the respective stripes of the light pattern on the viewing side may be selected by a respective width of the compression ribs, in particular, a diameter of the at least partially circular cross section of the respective compression rib. A light intensity of the respective stripes in the light pattern may be adjusted by selecting the respective depth of the cross section of the respective compression rib, or by the radius of the at least partially circular cross section. In other words, the cross section of the respective compression rib is selected in such a way that a predefined structure of the light pattern can be achieved on the viewing side during intended use. In this way, for example, it is possible to achieve a structure of the light pattern which allows good masking of the transportation vehicle component covered at least in regions by the light guide.

The disclosure relates to a transportation vehicle, in particular, a passenger car, having an interior device as already described in connection with the disclosed interior device. The viewing side of the light guide faces toward the passenger compartment and the viewing side of the light guide is not fully covered from the passenger compartment by any transportation vehicle components. This means that at least one region of the viewing side of the light guide can be seen directly by vehicle passengers of the transportation vehicle. The light pattern can, therefore, be provided by few components in the transportation vehicle.

Elements which are the same or functionally equivalent are provided with the same reference signs in the figures.

FIG. 1 represents a rotary knob operating device 1. This rotary knob operating device 1 is an interior device for a passenger compartment of a transportation vehicle. The rotary knob operating device 1 is adapted to receive a user input of a vehicle passenger of the transportation vehicle, a vehicle function of the transportation vehicle being controlled as a function of the user input received. The rotary knob operating device 1 comprises a rotary switch 2 having a rotary element which consists of a light guide 3, 3'. This light guide 3, 3' is configured integrally and is configured to guide light. The light guide 3 has a viewing side 4, 4' and a rear side 5, 5' opposite to the viewing side 4, 4'. In the intended installation position of the rotary knob operating device 1 in the transportation vehicle, light is coupled out from the light guide 3, 3' through the viewing side 4, 4' of the light guide 3, 3'. Furthermore, in the intended installation of the rotary knob operating device 1, the viewing side 4, 4' of the light guide 3, 3' is visible in the passenger compartment of the transportation vehicle.

The rotary switch 2 is adapted to be rotated about a rotation axis 6 to perform the user input of a vehicle passenger. To enable this rotation of the rotary switch 2 about the rotation axis 6, the rotary knob operating device 1 comprises in addition to the rotary switch 2 a rolling bearing (not represented in FIG. 1) as a further transportation vehicle component. The light guide 3, 3' is held on the rolling bearing. The rolling bearing is likewise rotatable about the rotation axis 6. Because the rotary switch 2 is fastened fixed in rotation on the rolling bearing, when the rotary knob operating device 1 is actuated the light guide 3, 3' and the rolling bearing rotate together about the rotation axis 6 to perform the user input. The rotary switch 2 is fastened by the compression ribs 7, 7' of the light guide 3, 3', in particular, on a ball bearing made of metal as the rolling bearing.

To ensure secure rotationally fixed holding of the light guide 3, 3' on the rolling bearing, the light guide 3, 3' has at least one fastening element, in particular, a plurality of fastening elements, on its rear side 5, 5'. In the present case, the respective fastening elements are configured as compression ribs 7, 7'. In the present case, a plurality of compression ribs 7, 7' arranged at regular distances from one another and configured identically in their dimensions are arranged on the rear side 5, 5' of the light guide 3, 3'. The compression ribs 7, 7' run with their longitudinal extent direction in the extent direction of the rotation axis 6.

Figure 2:
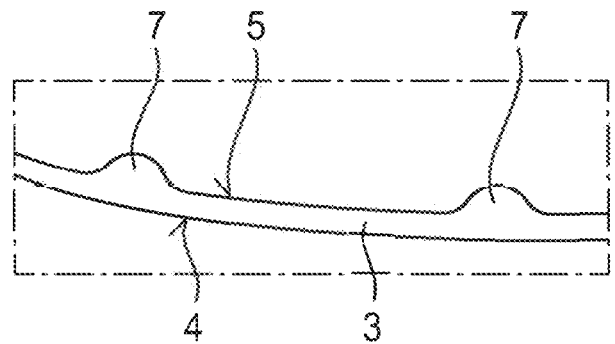
FIG. 2 shows a schematic sectional view of a light guide of the rotary knob operating device in a first exemplary embodiment.
Figure 3:
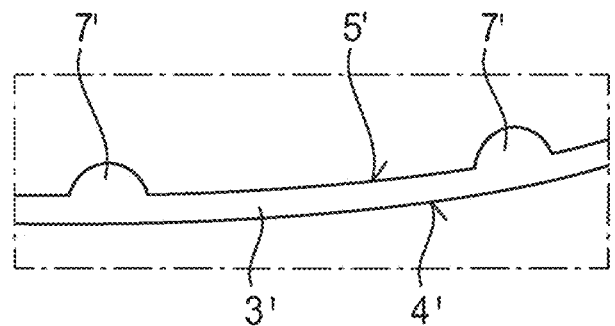
FIG. 3 shows a schematic sectional view of the light guide in a second exemplary embodiment.

FIGS. 2 and 3 represent details of the light guide 3, 3' in a cross section running perpendicularly to the rotation axis 6, FIG. 2 showing the compression ribs 7 in a first exemplary embodiment with soft transitions and FIG. 3 showing the compression ribs 7' in a second exemplary embodiment with hard transitions. As may be seen clearly in FIGS. 2 and 3, the light guides 3, 3' have a greater thickness in the region of the compression ribs 7, 7' than in a region adjacent to the compression ribs 7, 7'. By this material aggregation of the light guide 3, 3' in the region of the compression ribs 7, 7', the compression ribs 7, 7' influence light scattering properties of the light guide 3, 3' so that structuring of a light pattern coupled out from the light guide 3, 3' on the viewing side 4, which depends on a geometry and an arrangement of the compression ribs 7, 7', can be seen because of the compression ribs 7, 7' of the viewing side.

As may be seen in FIGS. 2 and 3, the compression ribs 7, 7' in the present case have an at least substantially semicircular cross section. Since the light pattern is provided by the light guide 3, 3' in the described rotary knob operating device 1 and furthermore the rotary switch 2 is held on the rolling bearing by the compression ribs 7, 7' of the light guide 3, 3', the rotary knob operating device 1 may be provided by few components. A transparent screen, which covers the light guide 3, 3' from the passenger compartment of the transportation vehicle, is not provided for the described light guide 3, 3'. The light guide 3, 3' may be configured to be opaque. During intended use, the light guide 3, 3' may provide light of different colors, in particular, 30 different colors.

Overall, the exemplary embodiments present a compression rib light guide design.

LIST OF REFERENCE SIGNS 1 rotary knob operating device
2 rotary switch
3 light guide having compression ribs with soft transitions
3' light guide having compression ribs with hard transitions
4 viewing side of light guide having compression ribs with soft transitions
4' viewing side of light guide having compression ribs with hard transitions
5 rear side of light guide having compression ribs with soft transitions
5' rear side of light guide having compression ribs with hard transitions
6 rotation axis
7 compression rib with soft transitions
7' compression rib with hard transitions

The invention claimed is:

1. A light guide comprising:
a rear side configured to receive light from a light source;
a viewing side opposite the rear side and configured to output light received by the rear side; and
at least one fastening element disposed on the rear side, the fastening element having a structure configured to produce a predefined light pattern coupled out of the viewing side;
wherein, the light guide is configured such that, when coupled to a rotating interior device for a passenger vehicle, the at least one fastening element holds the light guide to the interior device, with the viewing side of the light guide arranged perpendicular to an axis of rotation of the interior device, and the viewing side is visible in the passenger compartment,
wherein the at least one fastening element is a semicircular compression rib which forms a frictional engagement with a rolling bearing when a rotary element is fitted onto the rolling bearing such that the rotation of the rotary element causes corresponding rotation of an interior device for a passenger compartment of a transportation vehicle.

2. The light guide of claim 1, wherein the at least one fastening element comprises a plurality of identical fastening elements arranged at regular distances from one another on the rear side of the light guide, the plurality of identical fastening element configured to output a regular light pattern from the viewing side.

3. The light guide of claim 1, wherein the light guide is formed integrally.

4. A transportation vehicle comprising:
the light guide of claim 1 coupled to the interior device, wherein the viewing side faces toward the passenger compartment and the viewing side is not fully covered from the passenger compartment by any transportation vehicle components.

5. An interior device for a passenger compartment of a transportation vehicle, the interior device comprising:
the rotary element configured for rotation about a rotation axis to perform user input of a vehicle passenger;
the rolling bearing that is rotated about the rotation axis; and
the light guide of claim 1.

6. The interior device of claim 5, wherein a cross section of the at least one semicircular compression rib is configured to produce the desired light pattern to be output from the viewing side.

7. The interior device of claim 5, wherein the semicircular compression rib is a plurality of semicircular compression ribs distributed at regular distances over the circumference of the rotation axis.

8. The interior device of claim 7, wherein the at least one of the plurality of semicircular compression ribs runs extends longitudinally in the axial direction of the rotation axis.

\* \* \* \* \*